Fig. 2a¹

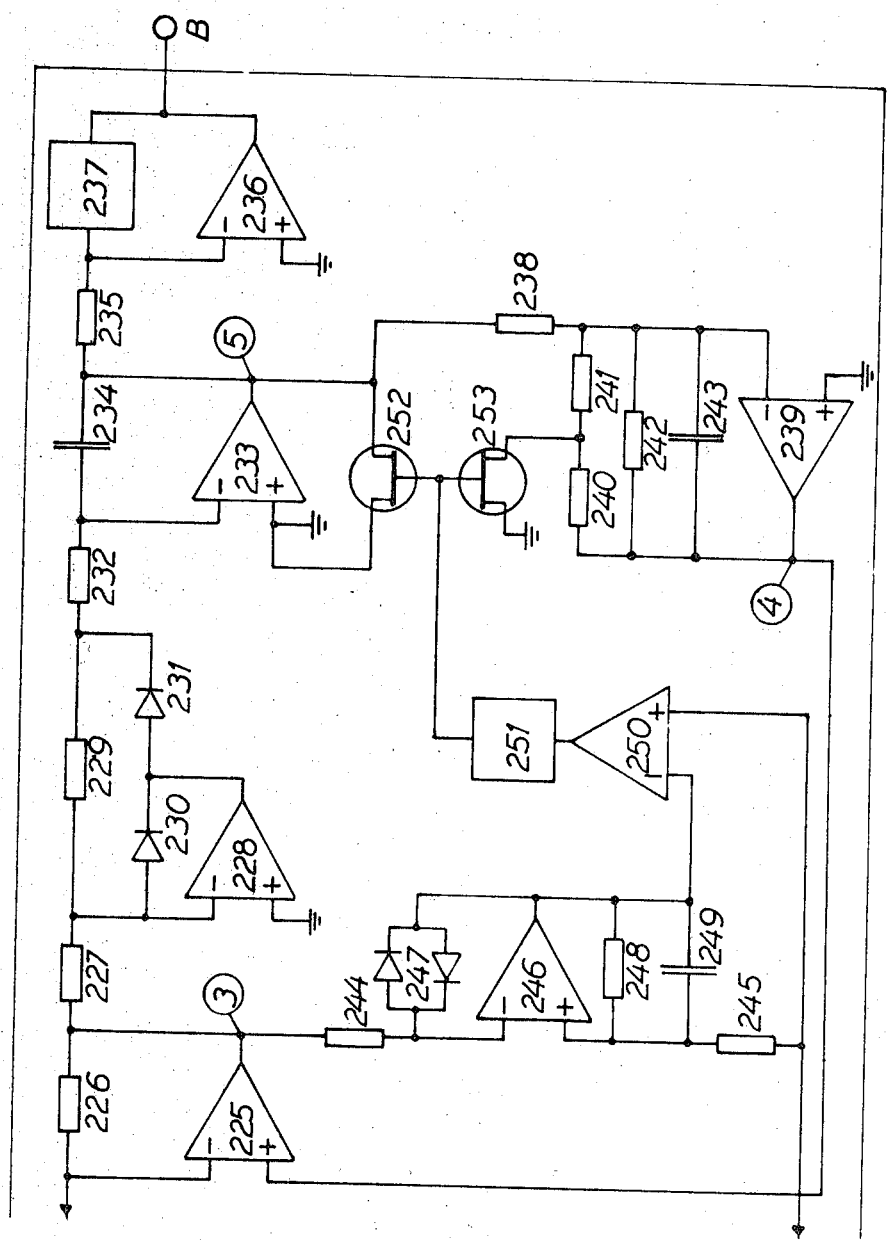
Fig. 2a²

United States Patent Office 3,554,012
Patented Jan. 12, 1971

3,554,012
METHOD AND ARRANGEMENT FOR DETERMINING THE MECHANICAL STATE OF MACHINES
Eivind Olav Söhoel, Tumba, Sweden, assignor to Konsultbyran Iko Aktiebolag, Tumba, Sweden
Filed Feb. 29, 1968, Ser. No. 709,451
Int. Cl. G01h 1/00
U.S. Cl. 73—67.2         6 Claims

ABSTRACT OF THE DISCLOSURE

A system for determining the mechanical state of machines by converting the mechanical vibrations occurring in said machines into electrical vibrations by means of a pickup, and analyzing the electrical oscillations; whereby transient oscillations are separated from the electrical oscillations and used as a basis for determining the mechanical state of the machine being tested.

---

The present invention is concerned with a method and a system for determining the mechanical state of machinery by converting the mechanical vibrations occurring therein by means of a pickup into electrical oscillations, and analyzing said electrical oscillations, whereby transient oscillations are separated from said electrical oscillations and used as a basis for determining said mechanical state.

It is well known that defects in the internal mechanisms of a machine will result in the occurrence of small, localized impacts and shocks. Examples of such defects are excess play between bearings and parts supported thereby; damaged and faulty bearings; the presence of foreign matter in the lubricant used; direct contact, in the case of plain or slide bearings, between shaft and bearing surface; play between the teeth of meshing gears; excess play between the control means of cyclically operating machines; these being but a few examples of the cause of internal impacts in machines.

A material shock wave (initial vibration) of very short transient rise time radiates outwards from the point of contact of the impacting bodies. The transient rise time and amplitude of the initial vibrations are essentially determined by the speed of sound through the material, and the mutual speed of rotation of the bodies involved; and are thus independent of the mass of said bodies.

The initial vibration causes a multitude of different transients of relatively high frequency in the material of the component parts of the machine; the amplitude, frequency and damping cycle of which transients are determined by the properties of the said material and of the design of the said components. The determination of the mechanical state of a particular machine, based on the measurement and analysis of the transient vibrations appearing therein, is thereby strongly affected by the characteristics (transient response) of that particular machine.

During the conversion of the mechanical vibration process to an analogous electrical oscillation process, said initial vibrations will generate transient oscillations in the pickup used. The frequency and damping process of these transients are determined by the characteristics of the pickup, and thus represent known physical quantities.

The invention can, for example, be used for registering, analysis and determination of the maximum amplitude, mean amplitude, amplitude distribution or energy content of the transient oscillations occurring in an acceleration meter or acoustic microphone when acted upon by mechanical vibrations. An electronic analysis apparatus is used to select, with the assistance of a high-pass filter, the frequency range in which said transient vibrations appear. The vibrations in the selected frequency range are further processed by means of a special discriminator and a gate system, so that only those oscillations which exceed the level to which a selected portion (e.g., 95%) of the amplitudes reach during a selected time period are allowed to pass through. If the occurrence or distribution frequency of the transient oscillation processes is not too high it is possible in this manner to isolate individual transient oscillations. The electronic analysis apparatus also determines the maximum amplitude, the mean amplitude or the amplitude distribution in the individual transient oscillations, or converts the energy content of the transient oscillations to an analogue pulse in which the amplitude is analogous to and varies proportionally with the energy content of the transient oscillations. Further, it is possible to make a statistical analysis of the distribution of the transients, or to establish the occurrence frequency of the transients as a function of magnitude (maximum amplitude, mean amplitude or energy), or to measure the average occurrence frequency of the transients at a selected magnitude, or to measure the maximum magnitude of the transients within a selected time period, or to determine the mean or maximum magnitude of the transients at a determined time period within the working cycle of the machine.

DETAILED DESCRIPTION OF INVENTION

The invention will now be described with reference to the accompanying drawings which illustrate embodiments of said invention.

FIG. 1 illustrates a block diagram of an apparatus used for practicing the invention.

FIGS. $2a^{1-2}$ illustrate the units in said apparatus for separating, discerning and the analogous conversion of the transients.

FIG. 3b illustrates the shape of the signal at certain points in FIG. 3a.

FIG. 4b illustrates the shape of the signal at certain points in FIG. 4a.

FIG. 5b illustrates the shape of the signal at certain points in FIG. 5a.

Figure 1:
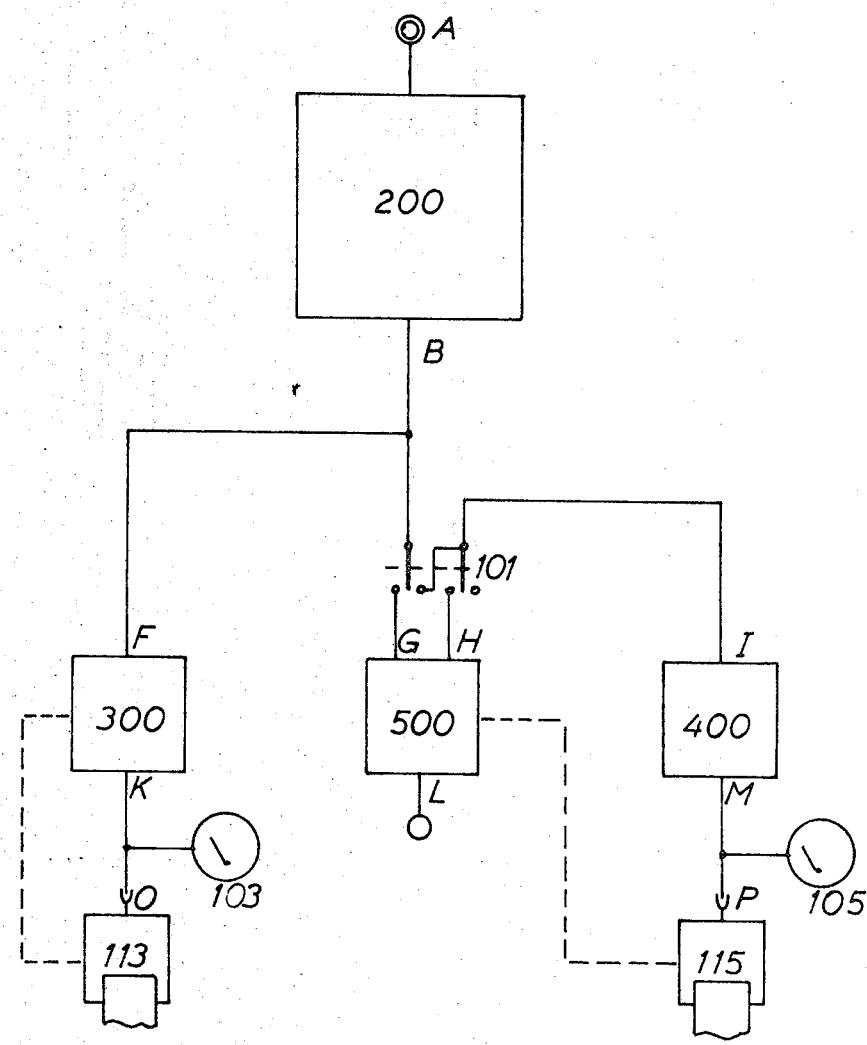

FIG. 1 shows a block diagram of an apparatus for analysing the transient oscillations generated in the pickup system during the conversion of mechanical vibrations to analogous electric oscillations, in accordance with the invention. In the shown example the said conversion is effected with the assistance of a piezoelectric acceleration meter having a resonance frequency between 30–40 kHz. The signals from the acceleration meter are fed over the input A to the unit 200 for frequency separation and discerning the individual transient oscillations. The individual transients are then integrated to unit pulses whose amplitudes are proportional to the energy content in said transients. Before leaving the unit 200 the unit pulses are converted to pulses having logarithmic amplitude functions. The logarithmic unit pulses are fed from the output terminal B—unit 200—to the measuring and analysing unit 300, or alternatively directly to the measuring unit 400 via a switch 101, or via the control unit 500 to the measuring unit 400. The unit 300 together with an indicating instrument 103 is intended for measuring the occurrence frequency of the unit pulses when exceeding a selected level. Further, the unit 300 can be used, by being mechanically connected to the writer 113, for analysing the accumulated occurrence frequency of the unit pulses as a function of the amplitude. The unit 400, together with the indicating instrument 105 or the writer 115, is intended for measuring the maximum amplitude of the unit pulses within a chosen time period. The control unit 500 is intended, with the assistance of synchronising pulses applied to the input terminal L from the measuring object, for segregating the unit pulses in determined time periods during the working cycle of the machine. Further, it is also possible to use the unit 500, with the assistance of a mechanical coupling with the writer 115, to analyse the maximum amplitude of the unit pulses as a function of the working cycle of the machine.

FIG. 2a shows the unit 200 in greater detail. Beginning from the input terminal A this unit contains a measurement amplifier adapted as a charge amplifier comprising an operational amplifier 201, a capacitor 202 and a level stabilising resistance 203. The signal passes from the measurement amplifier to a high-pass filter comprising an operation amplifier 204 and capacitors 205, 206 and 207 and resistances 208 and 209. The signal is then divided via a voltage divider 210, through an input resistance 211 to a comparator circuit comprising an operation amplifier 212, limit diodes 213, a resistance 214 and capacitor 215. The signal passes from the comparator circuit to a differential amplifier 217 and a pulse stretching circuit 218. The signal is fed from the pulse stretching circuit over a resistance 219, together with the constant current over a resistance 220 into an integration circuit comprising an operation amplifier 221 and a capacitor 222 and a diode 223. In turn the integration circuit is feed back coupled to the positive input of the differential amplifier 217 and to the positive input of the comparator circuit across the resistance 216. The signal from the voltage divider 210 is further distributed across an input resistance 224 to a level control circuit comprising an operation amplifier 225 and a resistance 226. The signal passes from the level control circuit through the input resistance to a precision rectifier comprising an operational amplifier 228, a resistance 229, a diode 230 and a diode 231. The signal passes from the precision rectifier via an input resistance 232 to a signal integration circuit comprising an operational amplifier 233 and a capacitor 234. Before being fed to the output terminal B the signal passes a logarithmic circuit comprising an input resistance 235, an operational amplifier 236 and a logarithmic feed back unit 237. The signal is fed back from the output of the integrational amplifier 233 to the positive input of the level control amplifier 225 via a damping simulator. The damping simulator comprises an input resistance 238, an operation amplifier 239, resistances 240, 241, 242 and a capacitor 243. Connected between the outputs of the level control amplifier 225 and the integrational amplifier 221 is a comparator circuit comprising an input resistance 244 and 245, an operation amplifier 246, limit diodes 247, a resistance 248 and a capacitor 249. The signal passes from the output of the comparator to a differential amplifier 250 and on to a pulse stretching circuit 251. The pulses sent from the pulse stretching circuit control in turn a zero setting transistor 252 and an impedance control transistor 253.

Figure 2B:
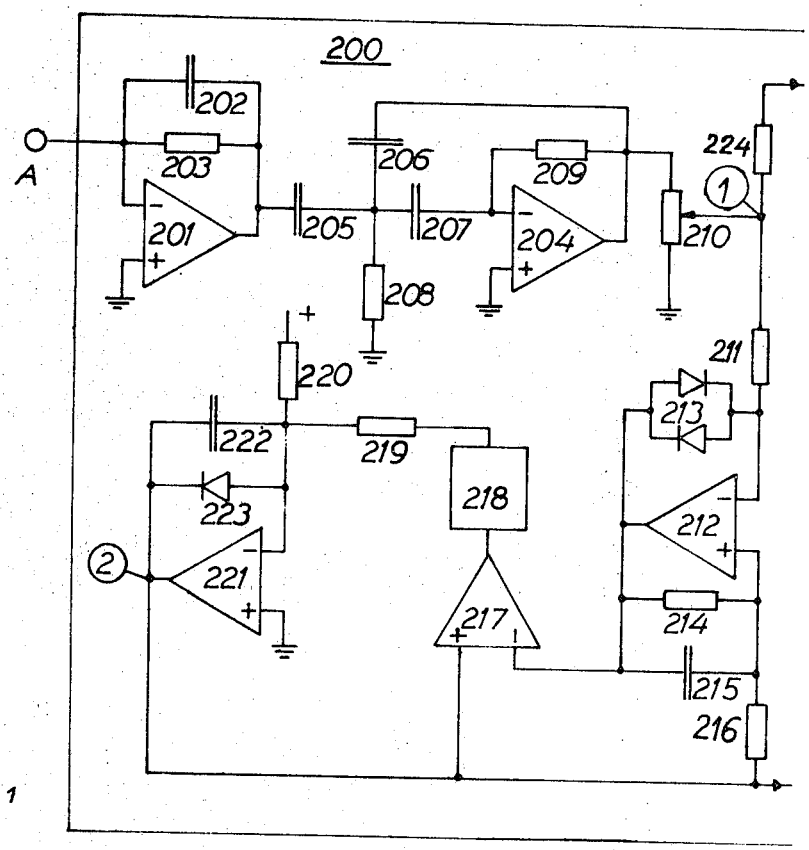
FIG. 2b illustrates the shape of the signal at certain points in FIG. $2a^{1-2}$.
Figure 2B:
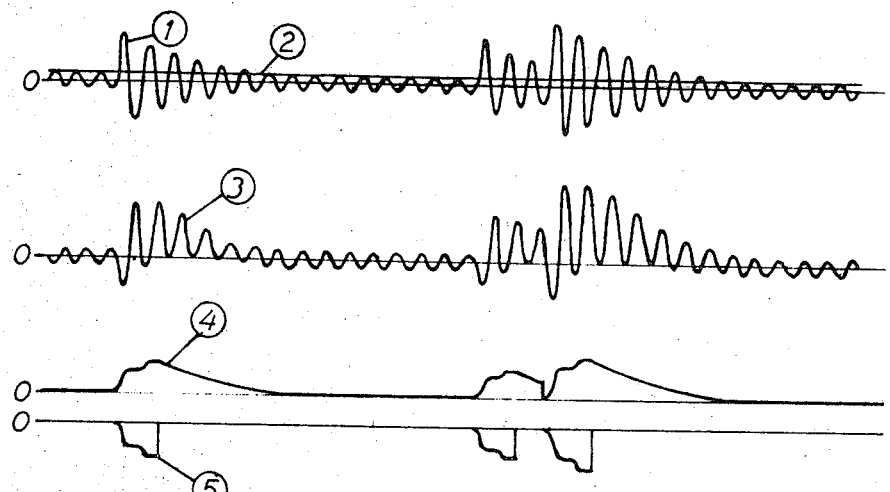

A number of points in FIG. 2a have been marked with the designations 1, 2, 3, 4 and 5. The shapes of the signals at these points are shown in FIG. 2b.

Figure 3A:
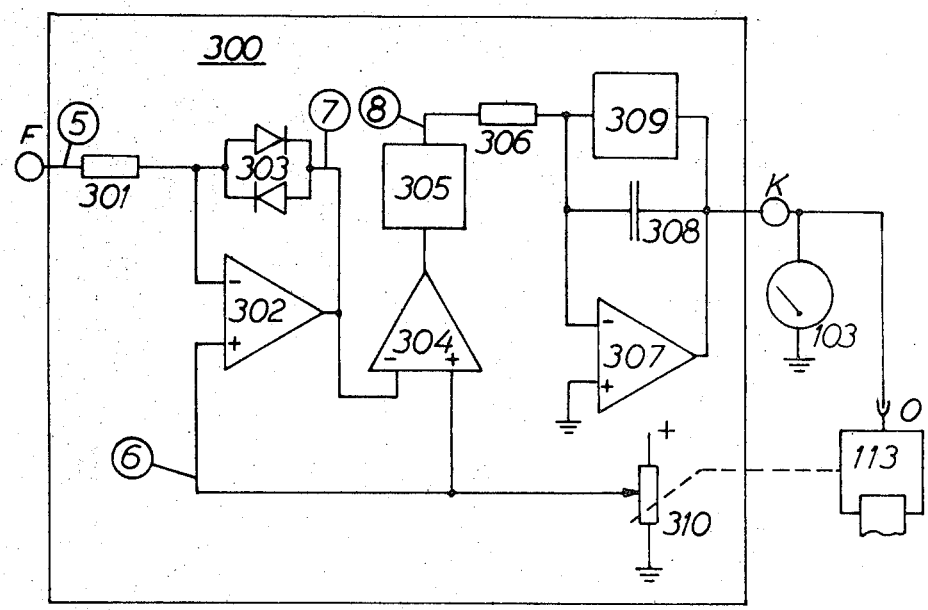
FIG. 3a illustrates a unit for analysing the occurrence frequency of the transients as a function of the magnitude of the same.

FIG. 3a illustrates schematically a unit for measuring the occurrence frequency of the transients when the magnitude of the same exceed a chose limit. Starting from the input terminal F the unit 300 contains a comparator circuit comprising an input resistance 301, an operational amplifier 302 and limiting diodes 303. The signal passes from the output of the comparator to a differential amplifier 304 and is fed into the trigger input of a monostable flip-flop 305. The pulses are fed from the monostable flip-flop into an integration circuit comprising an input resistance 306, an operation amplifier 307, a capacitor 308 and a logarithmic feed back circuit 309. The output of the integration circuit is connected via the output terminal K to the indicating instrument 103, or, alternatively, to the level writer 113. The positive inputs of the comparator amplifier 302 and the differential amplifier 304 are connected to a voltage divider 310. The said voltage divider can, in turn, be controlled mechanically by the level writer 113.

Figure 3B:
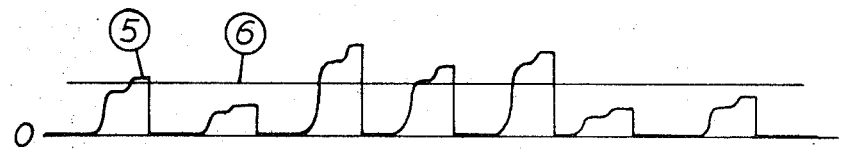
Figure 3B:
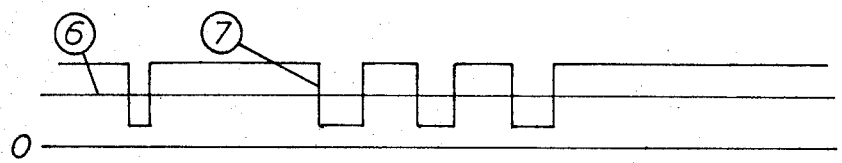
Figure 3B:
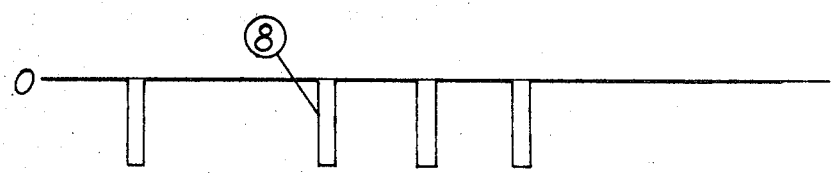

A number of points in FIG. 3a have been marked with the designations 5, 6, 7 and 8. The shapes of the signals at these points are shown in FIG. 3b.

Figure 4A:
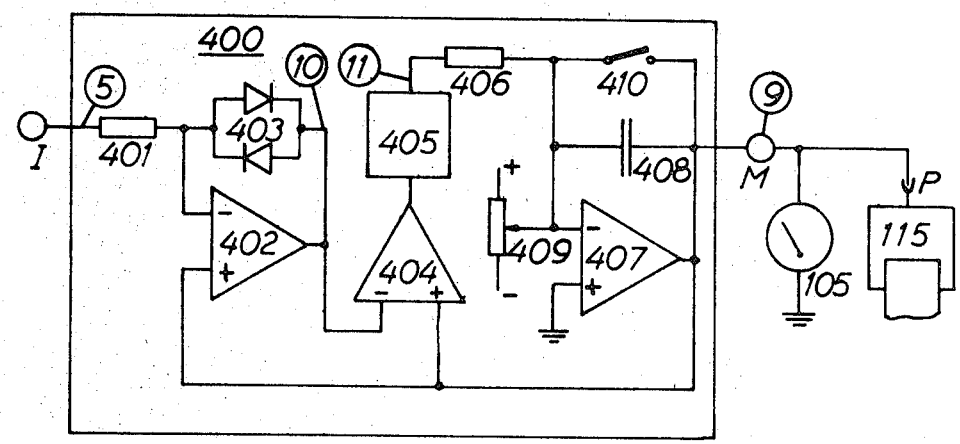
FIG. 4a illustrates a unit for measuring the maximum magnitude of the transients during a selected time period.

Shown in FIG. 4a is a unit for measuring the maximum magnitude of the transients during a selected time period. Starting from the input terminal I the unit 400 contains a comparator circuit comprising an input resistance 401, an operation amplifier 402 and limit diodes 403. The signal passes from the comparator to a differential amplifier 404 and a pulse shaper 405. The signal from the pulse shaper is then fed via an input resistance 406 to an integrator circuit comprising an operational amplifier 407, a capacitor 408, a variable resistance 409 and a zero setting switch 410. The signal is fed from the output of the integration circuit over the output terminal M to the indicating instrument 105, or, alternatively, to the level writer 115. The signal is fed back from the output of the integration circuit to the positive inputs of the comparator amplifier 402 and the differential amplifier 404.

Figure 4B:
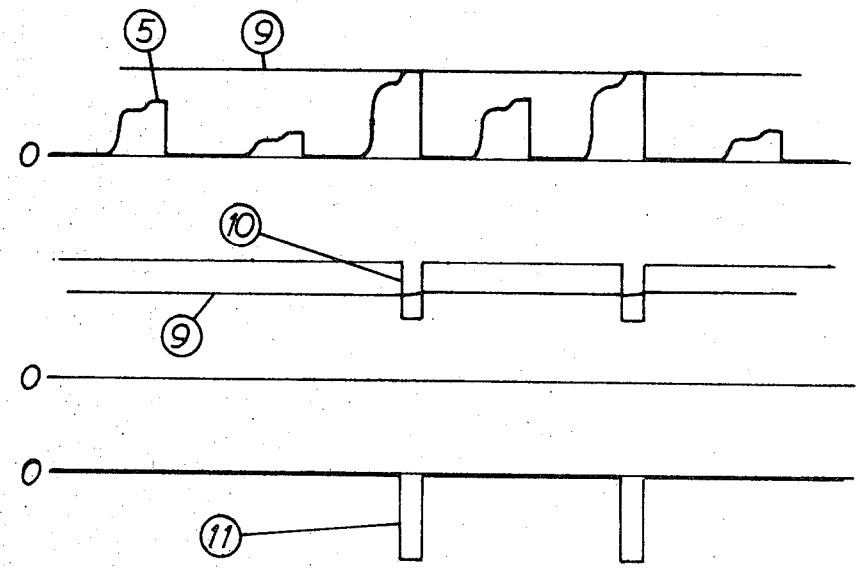

A number of points have been marked with the designations 5, 9, 10 and 11 in FIG. 4a. The shapes of the signals at these points are shown in FIG. 4b.

Figure 5A:
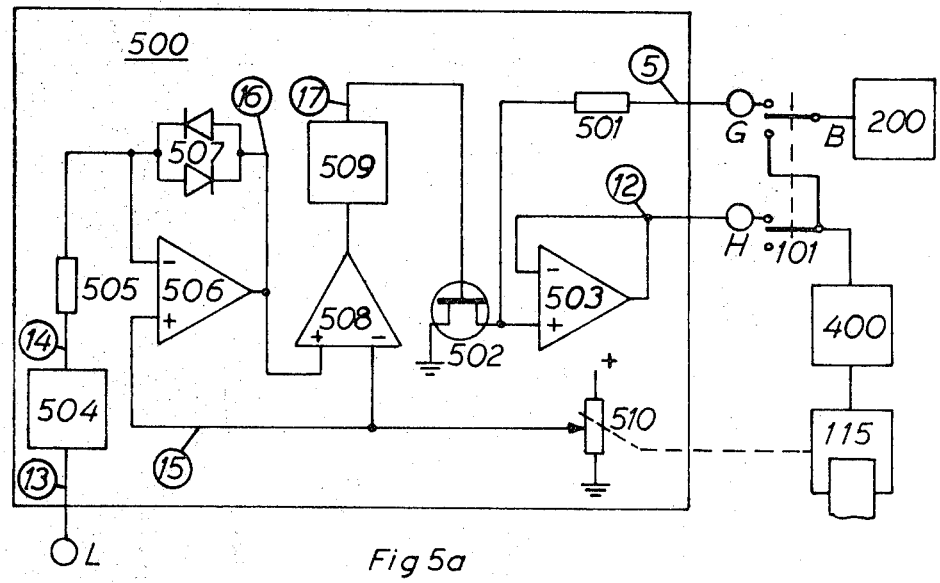
FIG. 5a illustrates a unit for determining the transients at an arbitrary time in the working cycle of the machine.

FIG. 5a shows a unit 500 for selecting the transients during a selected time period of the working cycle of the machine. The signal is fed from the main unit 200 over the switch 101, or alternatively direct to the unit 400, or via the unit 500. Starting from the input terminal G the unit 500 contains a signal gate circuit comprising a resistance 501, a field effect transistor 502 and a direct feedback coupled operational amplifier 503. The gated signal is fed from the output of the amplifier 503 to the output terminal H. The synchronizing pulses are fed from the input terminal L to the sawtooth pulse generator 504. The signal is fed from the sawtooth generator over an input resistance 505 to a comparator circuit comprising an operational amplifier 506 and limiting diodes 507. The signal then passes a differential amplifier 508 and a monostable flip-flop 509. The monostable flip-flop controls, in turn, the gate transistor 502. The positive inputs of the comparator amplifier 506 and the differential amplifier 508 are connected to a voltage divider 510. The voltage divider 510 can be controlled mechanically from the level writer 115.

Figure 5B:
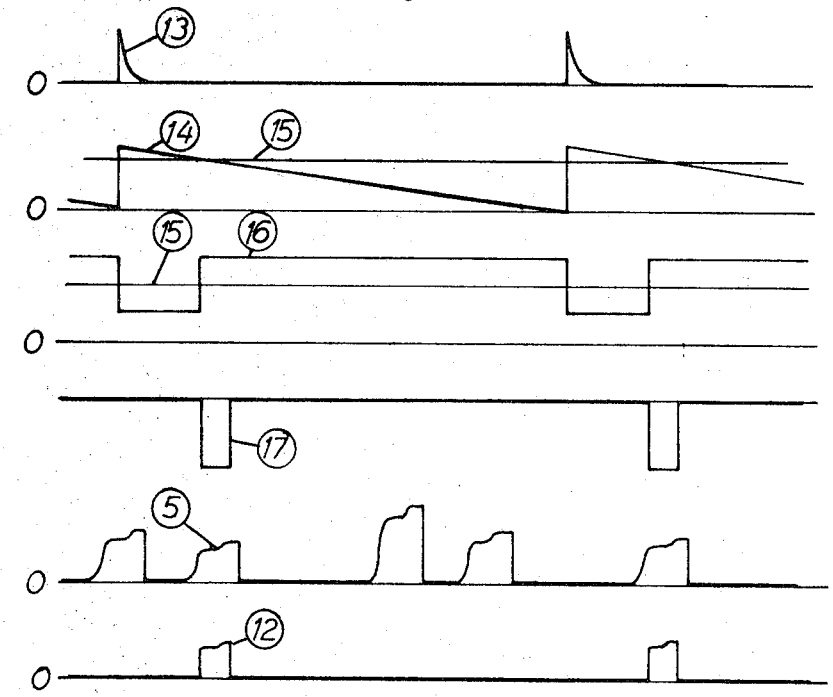

A number of points in FIG. 5a have been marked with the designations 5, 12, 13, 14, 15, 16 and 17. The shapes of the signal at these points are shown in FIG. 5b.

The described embodiment of the apparatus used for carrying out the invention will now be described in detail.

A piezoelectric accelerometer having a resonance frequency of 30–40 kHz. is used for converting mechanical vibrations to analogous electric oscillations. During the conversion initial shock waves radiate from the point of impact and create mechanical transients in the measuring system of the acceleration meter at the resonance frequency of the same. These mechanical transients will then form part of the electric oscillation process emitted from the acceleration meter and which in turn is fed over the input terminal A (FIG. 2a) of the main unit 200 to the charging amplifier circuit comprising components 201, 202 and 203. The signal from the charging amplifier circuit passes the high-pass filter comprising the items 204, 205, 206, 207, 208 and 209. The cutoff frequency of the said high-pass filter has been placed at 30 kHz.; the filtered signal thus essentially containing these electric transients which are analogous with the mechanical transients appearing in the acceleration meter. Owing to firstly the high frequency mechanical vibrations in the machine and secondly the small transients of high occurrence frequency in the acceleration meter a continuous oscillation of relatively low amplitudes is formed at said resonance frequency. Since it is difficult to discern individual transients within this continuous oscillation process the effect of these oscillations is eliminated by means of a discriminator system. The function of the discriminator system is based on the level, 95–100%, which the amplitudes in the filtered signal reach, said level being used as a reference when discerning such transients as those whose amplitudes exceed said level. The said level is measured by means of a comparator (components 211, 212, 213, 214, 215 and 216) and the pulses received therefrom are amplified over the differential amplifier 217 and stretched in the pulse stretcher 218 to negative pulses having a minimum length of $$\frac{1}{30,000} = 33.3 \text{ microseconds}$$

The stretched pulses, together with the positive current from the resistance 220, are passed over the resistance 219 to an integration circuit (components 221, 222 and 223) the output of which is, in turn, fed back to the positive input of the differential amplifier 217. In the case of a signal having a frequency of between 30–40 kHz., signal shape 1, a level will be obtained on the output of the integrator which corresponds to the level, 95–100%, which the positive amplitudes reach, signal shape 2. This level signal is passed further to a second comparator circuit (components 224, 245, 246, 247, 248 and 249) and is there compared with the signal from the filter over the level regulator (components 224, 225 and 226). The comparator will now produce negative pulses each time the amplitudes from the level regulator exceed the previously mentioned 95–100% level. The pulses from the comparator are further amplified over the differential amplifier 250 and are stretched in the pulse stretcher to a minimum length of 33.3 microseconds. For a transient oscillation of 30–40 kHz. a continuous pulse will, in this way, be produced from the pulse stretcher, providing that the amplitude of the transients at the output of the level regulator exceeds the 95–100% level. The use of these pulses for controlling the remaining functions will be described below. The signal is fed from the output of the level control over the resistance 227 to a precision rectifier (components 228, 229, 230 and 231). The signal from the rectifier is integrated in an integration circuit (components 232, 233 and 234). The signal is then fed back from the output of the integrator through the damping simulator (components 238, 239, 240, 241, 242 and 243) to the positive input of the level control amplifier 225; further, the integator (232, 233 and 234) is permitted to function only when the control pulses from the pulse stretcher 251 hold the field effect transistor 252 closed. The pulses from the pulse stretcher 251 simultaneously control the field effect transistor 253, which in turn controls the feed back impedance (240, 241, 242 and 243) in the damping simulator. The signal obtains the signal shape 3 at the output of the level control circuit and the signal shape 4 at the output of the damping simulator. The result of this process is that pulses are obtained on the output of the integration circuits (232, 233 and 234) whose amplitudes are proportional to a partial integration of the first two or three half cycles in the individual transients whose amplitudes exceeds said 95–100% level, as shown by signal shape 5. Further, it is possible by means of the described damping simulator to discern the individual transients even though these merge into one another to a certain extent, as shown in signal shapes 1, 3, 4 and 5. Before the pulses from the integrator (232, 233 and 234) are passed out to the output terminal B they are converted to logarithmic amplitude functions by means of the operational amplifier 236, the resistance 235 and the logarithmic feed back unit 237.

In the unit illustrated in FIG. 3a for the analysis of the occurrence frequency of the transients as a function of the magnitude of the same, the logarithmic integrated pulses are passed from the main unit 200 into the input terminal F of the unit 300, signal shape 5 (FIG. 3b). The signal is then passed from the input terminal over the resistance 301 to a comparator circuit (component 302 and 303). The positive input of the comparator is controlled by the voltage divider 310. A negative pulse is then obtained on the output of the comparator (signal shape 7), for each input pulse which exceeds the set level of the voltage divider 310, signal shape 6. These pulses are further amplified in the differential amplifier 304 and are passed in to the trigger input of the monostable flip-flop 305. The pulses, signal shape 8, obtained in the monostable flip-flop at a constant amplitude and oscillation period are then passed, via the resistance 306, to the integrator circuit (component 307 and 308), which is in turn feedback coupled through the logarithmic feedback circuit 309. The result of this process is that a signal is obtained on the output terminal K at a voltage level which is proportional to the logarithm of the mean number of pulses fed per unit of time above the selected control level. The occurrence frequency can, in turn, be read from the indicating instrument 103, or be registered with the level writer 113. The voltage divider 310 can be mechanically controlled from the level writer 113 to analyse the amplitude distribution.

In the unit shown in FIG. 4a for measuring the maximum magnitude of the transients during a selected period of time the pulses obtained from the main unit 200, signal shape 5, are fed to the input terminal I. The signal is then passed over the input resistance 401 to a comparatory circuit (components 402 and 403). The pulses, signal shape 10, obtained from the comparator are then amplified in the differential amplifier 404 and converted to negative pulses in the pulse shaper 405, signal shape 11. The pulses are fed from the pulse shape over a resistance 406 to an integration circuit (components 407 and 408), the output of which, signal shape 9, is in turn fed back to the positive input of the comparator. The voltage divider 409 is used for balancing the operation of the integration circuit, and the switch 410 is used for controlling the selected time period and zero setting of the integrator. The result of this process is that a voltage is obtained on the output terminal M of a magnitude equal to the maximum amplitude of the pulses fed in during a selected time period. The magnitude of the amplitude can, in turn, be read on the indicating instrument 105, or be registered by the level writer 115.

In the unit shown in FIG. 5a, for selecting the transients at certain time periods in the working cycle of the machine, output pulses are fed from the main unit 200, signal shape 5, via the switch 101 to the signal input G of the unit 500. The signal is then passed through a signal gate comprising the resistance 501 in the field effect transistor 502 and the feedback operational amplifier 503 to the output terminal H. The signal is only able to pass when the field effect transistor 502 is closed. Synchronizing pulses are fed from the machine (e.g. by means of a photocell) over the input terminal L to the synchronizable sawtooth generator 504, signal shape 13, for controlling said signal gate. The synchronized sawtooth voltage, signal shape 14, is then passed over the resistance 505 to a comparator circuit (components) 506 and 507). The positive input of the comparator is controlled by the voltage divider 510, signal shape 15. Pulses are then obtained from the output of the comparator circuit, which alternate each time the sawtooth voltage passes the level set on the voltage divider, signal shape 16. These pulses are further amplified in the differential amplifier 508, and are then fed into the trigger input of the monostable flip-flop 509. The pulses obtained from the monostable flip-flop, signal shape 17, then control the field effect transistor 502, and thereby the signal gating, so that only those portions of the signal obtained from the unit 200 which coincide with the selected time point in the working cycle are allowed to pass through, signal shape 12. The pulses which pass the unit 500 in this manner can then be measured by the previously described unit 400, and then registered in the level writer 115. The voltage divider 510 can be controlled mechanically from the level writer 115 for the purpose of effecting an analysis of a complete working cycle of the machine.

The method and devices described in the aforegoing can be modified arbitrarily within the scope of the following claims. Naturally, the invention can also be applied in many other cases than those mentioned in the introduction.

What is claimed is:

1. A method for detecting and analyzing the mechanical state of a machine having moving parts, said method comprising converting machine vibrations into oscillatory electrical signals through a transducer having a resonant frequency higher than the vibration frequencies normally occurring in the machine, converting shocks occurring within the machine into oscillatory electrical transient signals at the resonant frequency of the transducer, passing only those signals having a frequency equal to the resonant frequency of the transducer through a high pass filter connected to said transducer, and analyzing the signals passed by the filter.

2. A method according to claim 1 comprising separating individual electrical transient signals from other signals obtained as a result of other electrical oscillations, and converting the individual transient signals into individual analogous pulses where the maximum amplitude of each pulses varies proportionally with the energy content of the transient oscillations.

3. A method according to claim 2 comprising statistically analyzing the distribution of the analogous pulses.

4. In a system for detecting and analyzing the mechanical state of a machine having moving parts: transducer means having a resonant frequency higher than the vibration frequencies normally occurring in the machine for converting vibrations of the machine into oscillatory electrical signals and shocks within the machine into oscillatory electrical transient signals at the resonant frequency of the transducer means, high pass filter means connected to the transducer means for passing only those signals having a frequency equal to the resonant frequency of the transducer means, and analyzing means connected to the filter means for analyzing the signals passed by the filter.

5. In the system of claim 4, means for separating individual electrical transient signals from other signals obtained as a result of other electrical oscillations, and means for converting the individual transient signals into individual analogous pulses where the maximum amplitude of each pulse varies proportionally with the energy content of the transient oscillations.

6. In the system of claim 5, means for statistically analyzing the distribution of the analogous pulses.

References Cited

UNITED STATES PATENTS

| | | | |
|---|---|---|---|
| 2,963,647 | 12/1960 | Dean | 73—67.2X |
| 3,012,434 | 12/1961 | Wehof | 73—71.4 |
| 3,453,540 | 7/1969 | Dusheck, Jr. | 324—77(E) |

JAMES J. GILL, Primary Examiner